United States Patent [19]

Van Deutekom

[11] 4,312,928
[45] * Jan. 26, 1982

[54] RECHARGEABLE ELECTROCHEMICAL CELL

[75] Inventor: Huibert J. H. Van Deutekom, Eindhoven, Netherlands

[73] Assignee: U.S. Philips Corporation, New York, N.Y.

[*] Notice: The portion of the term of this patent subsequent to Jul. 22, 1997, has been disclaimed.

[21] Appl. No.: 110,435

[22] Filed: Jan. 7, 1980

Related U.S. Application Data

[63] Continuation of Ser. No. 902,712, May 4, 1978, abandoned, which is a continuation-in-part of Ser. No. 833,301, Sep. 14, 1977, abandoned.

[51] Int. Cl.$^3$ .............................................. H01M 4/00
[52] U.S. Cl. .................................... 429/27; 429/40; 429/60
[58] Field of Search .............. 429/27, 60, 223, 219, 429/40–46, 28, 29, 224

[56] References Cited

U.S. PATENT DOCUMENTS

| | | | |
|---|---|---|---|
| 2,571,927 | 10/1951 | Neumann et al. | 136/6 |
| 3,174,879 | 3/1965 | Stanimirovitch | 429/60 |
| 3,405,008 | 10/1968 | Dilworth et al. | 429/42 |
| 3,850,694 | 11/1974 | Dunlop et al. | 429/27 X |
| 3,980,501 | 9/1976 | Feder et al. | 429/60 |
| 4,003,754 | 1/1977 | Winsel et al. | 429/60 X |
| 4,112,199 | 9/1978 | Dunlop et al. | 429/29 |

OTHER PUBLICATIONS

Hydrogen Absorp. in LaNi$_5$ & Related Compounds: Exp. Observations & Their Explanation, van Mel et al., Jour. of the Less-Common Metals, 35 (1974), pp. 65–76.

Some Useful Relationships Between the Phy. & Thermodynamic Prop. of Metal Hydrides, Lundin et al., Intersoc. Energy Conv., Sep. 1976, pp. 961–964.

A Correlation Between the Interstitial Hole Sizes in Intermetallic Compound & the Thermodynamic Prop. of the Hydrides Formed from those Compounds, Lundin et al., Jour. of the Less-Common Metals, 56 (1977), pp. 19–37.

*Primary Examiner*—Charles F. Lefevour
*Attorney, Agent, or Firm*—Marc D. Schechter

[57] ABSTRACT

Rechargeable cell, which is sealed from the external atmosphere, having a negative electrode of, for example, LaNi$_5$ or an intermetallic compound derived therefrom wherein the negative electrode has a greater quantity of electrochemically active compound than the positive electrode. When the positive electrode is in the fully discharged state, the excess quantity of active compound at the negative electrode is partly in the charged state (that is to say, being partly in the hydride form.).

1 Claim, 3 Drawing Figures

RECHARGEABLE ELECTROCHEMICAL CELL

This is a continuation of application Ser. No. 902,712, filed May 4, 1978, now abandoned which is a continuation-in-part of Ser. No. 833,301, filed Sept. 14, 1977, now abandoned.

BACKGROUND OF THE INVENTION

The invention relates to a rechargeable electrochemical cell which is sealed from the external atmosphere and which comprises a sealed chamber containing (a) a positive electrode, the electrochemically active material of which can reversibly store and release a proton and an electron, (b) a negative electrode, the electrochemically active material of which consists of a metal combination which forms a hydride with hydrogen, and (c) an aqueous electrolyte solution having a pH of more than 7. In addition the cell may comprise a separator which electrically separates the electrodes but allows ion and gas transport. Hereinafter such a cell will be referred to as a "sealed cell". However, if desired, such a cell may be provided with a relief valve which becomes operative at a predetermined gas pressure in the cell. The invention also relates to a method of producing sealed cells.

A rechargeable, sealed cell of this type is, for example, disclosed in U.S. Pat. No. 3,874,928. For this known cell the electrochemically active material of the positive electrode may consist of nickel hydroxide, silver oxide or manganese oxide, nickel hydroxide generally being preferred for practical reasons. The electrochemically active material of the negative electrode, may, for example, consist of an intermetallic compound of lanthanum and nickel having an empirical formula $LaNi_5$.

It is known that with hydride forming intermetallic compounds of this nature both the lanthanum and the nickel can be partially replaced by other metals such as, as regards the lanthanum for example, by calcium, thorium, titanium and rare earth metals, yttrium, and as regards the nickel for example, by copper, chromium and iron. (See, for example, United Kingdom Pat. No. 1,463,248.) If hereinafter $LaNi_5$ and intermetallic compounds derived therefrom by substitution with other metals are mentioned then this should be understood to mean compounds which, in general, have the composition $LaNi_n$, where n may be between 4.8 and 5.4. This indicates compounds with $CaCu_5$ crystal structure whose existence range includes $LaNi_5$. The expression existence range is understood to mean a range of concentrations in a continuous system of intermetallic compounds with which an identical structure can be realized with or without a heat treatment.

When constructing systems which are sealed from the external environment and which comprise hydrides of intermetallic compounds, the hydrogen equilibrium pressure above the hydride and the working temperature of the system must be taken into account. For the hydride of $LaNi_5$ this equilibrium pressure is, at 20° C., approximately 2.5 Bar. For the hydride of $LaNi_4Cu$ this pressure is only about 0.7 Bar at 20° C. and for the hydride of $LaNi_4Cr$ about 0.31 Bar at 20° C. If the electrochemical properties are acceptable, the latter materials will be preferred for producing sealed, rechargeable cells because the casing need not be as strong then.

In general the electrolyte solution consists of an aqueous solution of one or more alkali metal hydroxides, such as lithium hydroxide and potassium hydroxide. The separator may consist of a synthetic fiber (woven or non-woven), for example of polyamide or polypropylene, fiber.

The operation of a rechargeable electrochemical cell of this type differs fundamentally from a so-called nickel-cadmium battery, as a comparison of the electrochemical equations shows. With a rechargeable cell to which the invention relates, this equation is of the following form, wherein nickel hydroxide has been taken as the positive electrode material and the intermetallic compound is indicated by M:

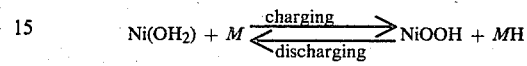

For the known nickel-cadmium battery this equation may be written as:

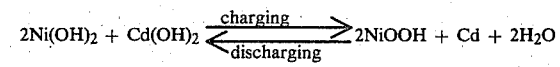

It can be seen that in the first case on charging as well as on discharging only a proton transfer takes place between the electrodes whereas the total quantity of electrolyte solution remains substantially constant. In the second case water is formed during charging which disappears again during discharging. In this cell measures must be taken to enable the storage of the formed water without this water obstructing the oxygen-gas transport between the electrodes. This requires additional space in the battery casing. On the basis of this difference in electrochemical behavior (and also for other reasons) measures taken to solve the problems inherent in the known nickel-cadmium cells cannot be applied to cells to which the invention relates. Such measures may even be superfluous in the latter cells as will be further explained below.

With sealed, rechargeable cells of the type to which the invention relates not only the hydrogen equilibrium pressure of the hydride of the intermetallic compounds, as explained above, is important but also the phenomena which occur during overcharging and over-discharging of these cells. Overcharging is in practice a risk which must be taken into account when designing cells for rechargeable batteries. Over-discharging is a phenomenon which can occur if one or more of a plurality of series-arranged cells, for example in a battery having three or more cells, is fully discharged at an earlier instant than the other cells owing to differences in capacity which are unavoidable during fabrication. The battery then continues to supply current. Both overcharging and over-discharging can, if no special provisions are made in the cells, result in the occurrence of high gas pressures and, as the case may be, in explosive gas mixtures being expelled through a valve. This causes the cell to dry out and the charge equilibrium between the electrodes is disturbed.

SUMMARY OF THE INVENTION

An object of the invention is to provide a rechargeable, sealed electrochemical cell of the aforesaid type in which provisions are made to maintain a reversible equilibrium in the cell in all circumstances and to prevent the occurrence of high gas pressures at overcharging and over-discharging as much as possible. In accordance with the invention this object is fulfilled by means of a cell described above in which the quantity of electrochemically active material of the negative electrode exceeds that of the positive electrode. Additionally in the fully discharged state of the positive electrode, the excess of the electrochemically active compound of the negative electrode is at least partially present as a hydride (that is to say in the charged state).

Such a cell can be produced in accordance with a further aspect of the invention by means of a method in which when the electrodes are placed in the cell the electrochemically active material of the positive electrode is in the discharged state and the electrochemically active material of the negative electrodes, at least as regards the excess, is partially present as a hydride (that is to say in the charged state) and the cell is sealed with the electrodes in this state.

In accordance with another method uncharged electrodes are placed in the cell, the cell is filled with the quantity of hydrogen required for partially charging the negative electrode and the cell is hermetically sealed thereafter. Thereafter the cell is formed by successively charging and discharging it a number of times (for example five times).

Such an excess of the electrochemically active material is preferably applied at the negative electrode relative to that at the positive electrode so that the electrochemical capacity of the negative electrode exceeds the electrochemical capacity of the positive electrode by at least 15%. In principle the maximum excess is unlimited as will appear from the following explanation. In an preferred embodiment the electrochemical capacity of the negative electrode is about 1.5 times the electrochemical capacity of the positive electrode.

In a suitable embodiment, if the positive electrode is fully discharged, approximately at least 10% and not more than 90% of the excess in capacity is still present at the negative electrode in the hydride form. This means that at the moment the positive electrode is fully charged a minimum of 10% of the excess in capacity at the negative electrode is still in the uncharged state. When producing a cell according to the invention the negative electrode can, for example, be brought to a partially charged state prior to being built into the cell. To this end the negative electrode can, for example, be brought to a partially charged state in an auxiliary cell by passing an electric current through it. The auxiliary cell comprises an inert electrode, of for example platinum, carbon, stainless steel, or titanium, as the positive electrode. This is, however, a cumbersome method. Preference is, therefore, given to the method explained above, in which the electrodes are introduced into the cell subsequently the cell is filled with a hydrogen atmosphere.

The invention will now be explained in greater detail with reference to the accompanying drawing.

DESCRIPTION OF THE PREFERRED EMBODIMENTS

Figures 1, 2:
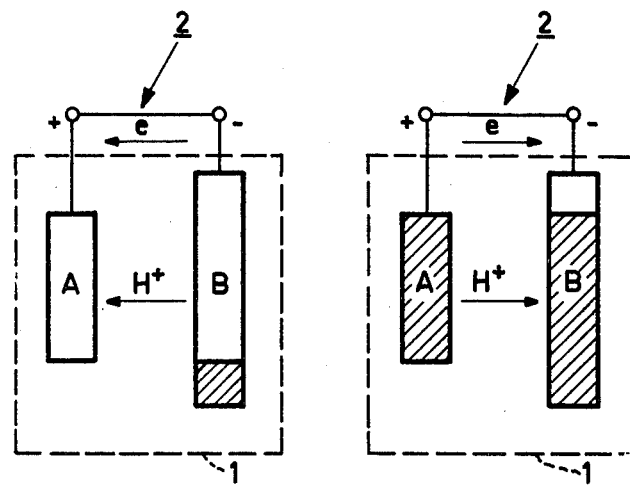
FIG. 1 shows diagrammatically a cell according to the invention during discharging.
FIG. 2 shows diagrammatically a cell according to the invention during charging.

In the cell according to the invention, whose wall is schematically indicated by means of a dotted line 1 (FIG. 3), there are in contact with an electrolyte solution, for example a solution of potassium hydroxide in water (5N), a positive electrode A, whose electrochemically active material consists of nickel hydroxide and a negative electrode B, whose electrochemically active material consists of $LaNi_5$, $LaNi_4Cu$ or $LaNi_4Cr$. The dimensions of the rectangles A and B, in FIGS. 1 and 2 are an indication of the relative quantity of electrochemically active compound at each of the electrodes. The hatched portion thereof indicates how much of the active material is in the charged state. The effect of these quantities according to the invention is as follows.

During discharging (FIG. 1) electrons flow through an electric conductor 2 from the negative electrode B to the positive electrode A. An electrochemical reaction takes place at the positive electrode, which can be expressed as follows

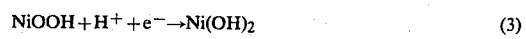
$$NiOOH + H^+ + e^- \rightarrow Ni(OH)_2 \tag{3}$$

and at the negative electrode

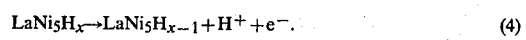
$$LaNi_5H_x \rightarrow LaNi_5H_{x-1} + H^+ + e^-. \tag{4}$$

If the positive electrode is fully discharged, that is to say all the available NiOOH has been converted into Ni(OH)$_2$, hydrogen ions can still form at the negative electrode in accordance with reaction equation (4) because a part of the active material is still in the hydride form. If the cell is connected in series with other cells which have not yet been fully discharged a current will continue to flow and, consequently, protons will flow in the electrolyte solution from the negative electrode to the positive electrode. Reactions take place then, which can be expressed as follows:

At the positive electrode:

$$H^+ + e^- \rightarrow \tfrac{1}{2}H_2. \tag{5}$$

At the negative electrode:

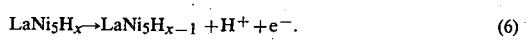
$$LaNi_5H_x \rightarrow LaNi_5H_{x-1} + H^+ + e^-. \tag{6}$$

The hydrogen formed at the positive electrode diffuses to the negative electrode and reacts with discharged active material, which can, for example, be expressed as follows.

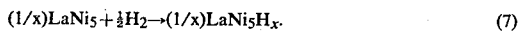
$$(1/x)LaNi_5 + \tfrac{1}{2}H_2 \rightarrow (1/x)LaNi_5H_x. \tag{7}$$

What comes as a surprise is that simultaneously, at the same electrode, hydrogen can be stored by forming a hydride, and protons (H$^+$) can be formed.

During charging of the cell (FIG. 2) a reaction takes place at the positive electrode, which can be expressed as follows:

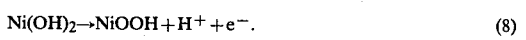
$$Ni(OH)_2 \rightarrow NiOOH + H^+ + e^-. \tag{8}$$

and at the negative electrode

$$(1/x)LaNi_5 + H^+ + e^- \rightarrow (1/x)LaNi_5H_x \tag{9}$$

At the moment the active material at the positive electrode has been completely converted into the charged state (NiOOH) a portion of the active material at the negative electrode is still in the uncharged state. If now the charging current continues to flow reactions take place, which can be expressed as follows:

At the positive electrode oxygen gas is produced:

$$2H_2O \rightarrow O_2 + 4H^+ + 4e^-. \quad (10)$$

At the negative electrode the above-mentioned reaction (9) continues. The oxygen formed diffuses to the negative electrode and reacts with the hydride thereby forming water, which reaction can, for example, be expressed as follows:

$$LaNi_5H_x + O_2 \rightarrow LaNi_5H_{x-4} + 2H_2O \quad (11)$$

In practice this reaction (11) appears to proceed at such a speed that all the oxygen offered is converted. In the reaction equations (4), (6), (7), and (9) x may have a value between 4 and 6.

From the above it follows directly that the invention, both during overcharging and during over-discharging prevents high gas pressures from occurring. It also appears that the invention is permanently effective.

Other hydride-forming intermetallic compounds which may be used in the cell according to the invention are TiNi and TiFe.

With the above mentioned nickel-cadmium cell, a so-called charge reserve (excess of active material) at the negative electrode) is fully depleted in the course of time. With this cell the electrochemical capacity decreases if material of the negative electrode is over-discharged.

A further advantage of the cell according to the invention is that the electrochemically active material of the negative electrode may consist of a material such as LaNi$_4$Cr which, as such, cannot properly stand up to overdischarging. In a cell according to the invention the hydride electrode never attains such a low potential that, for example, copper which may be used in an electrode construction obtained by sintering of the electrode material, for example LaNi$_5$, starts corroding.

Cells according to the invention can be combined to form a secondary battery for instance by connecting several cells in series.

An embodiment of a cell according to the invention will now be explained in greater detail with reference to the accompanying FIG. 3.

Figure 3:
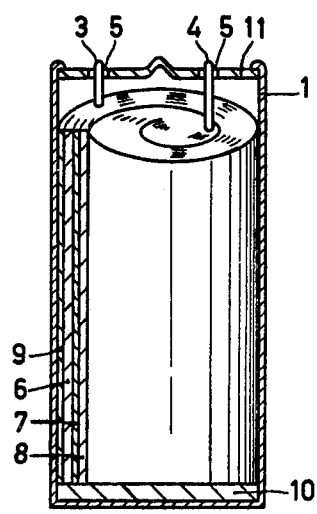
FIG. 3 shoes a perspective view partially in section of a cell according to the invention.

The hermetically sealed cell shown in FIG. 3 is manufactured using a suitable casing 1 of a metal such as stainless steel, provided with a cover 11 with openings through which the conductors 3 and 4 are led out. The conductors are insulated from the metal casing (1,11) by means of synthetic resin rings 5. Externally the casing has, for example, a diameter of 22 mm and a height of 41 mm. A wound section is provided consisting of a negative electrode 6, a separator 7 and a positive electrode 8. This wound section further comprises an electrically insulating plastic film 9, for example of polyvinyl chloride. A disc 10, of an electrically insulating material such as polyvinyl chloride, is introduced into the chamber of the casing to support the wound section.

The negative electrode 6 consists of an intermetallic lanthanum nickel copper compound (LaNi$_4$Cu) and is connected to the conductor 3. The negative electrode 6 is manufactured by sintering a suitable quantity of LaNi$_4$Cu, mixed with copper powder (1:1 by volume). The positive electrode 8 is a nickel hydroxide electrode of the conventional, commercial sintered type, connected to the conductor 4. A six normal aqueous solution potassium hydride is used as an electrolyte absorbed in the separator 7. The electrolyte is in wet contact with the electrochemically active material of the two electrodes. The separator 7 consists of very finely woven gauze of polyamide fibres (nylon).

The electrochemical capacity of the negative electrode 6 is equal to 1.5 times the electrochemical capacity of the positive electrode 8, the latter having a capacity of ampere hours (Ah) (1gr. of LaNi$_4$Cu corresponds to about 0.26Ah). Before being hermetically sealed the cell is filled with a quantity of hydrogen gas corresponding to 0.12Ah, which corresponds to approximately 50 standard cm$^3$ of hydrogen gas. After having been charged and discharged for 5 cycles, the hydrogen has been absorbed by the negative electrode, resulting in the formation of a negative reserve capacity. The free gas space in the cell is approximately 5 cm$^3$. A sealed cell of this type has an EMF of 1.3 volts (v). Prolonged over-charging or over-discharging does not adversely affect the quanlity of the cell or create a risk of explosions.

A surprising feature of this cell is that passivation of the negative electrode material with respect to the absorption of hydrogen from the gas phase does not occur, which is usually the case when LaNi$_5$ and compounds derived therefrom come into contact with oxygen and water or water vapor, respectively. It is assumed that this is associated with the fact that the cell is sealed from the external atmosphere.

It is claimed:
1. A rechargeable electrochemical cell which is sealed from the external environment, comprising, in a chamber which is sealed from the environment:
   a positive electrode comprising an electrochemically active material selected from the group consisting of nickel hydroxide, silver oxide and manganese oxide;
   a negative electrode comprising, as an electrochemically active material a metal hydride forming material of the LaNi$_n$ type, n being between 4.8 and 5.4, in which both La and Ni may be partially substituted by other metals, said LaNi$_n$ or substitution product thereof having a CaCu$_5$ structure; and
   an aqueous electrolyte having a pH exceeding 7;
   wherein the quantity of the electrochemically active material of the negative electrode exceeds that of the positive electrode by at least approximately 15%, and in the fully discharged state of the positive electrode the electrochemically active compound of the negative electrode, as regards the excess, is at least partially present as a hydride, namely in the charged state.

* * * * *